United States Patent
Coan et al.

(10) Patent No.: US 6,337,975 B1
(45) Date of Patent: Jan. 8, 2002

(54) SYSTEM AND METHOD FOR POWER MEASUREMENT IN OUTDOOR ANTENNA UNITS

(75) Inventors: Phil Coan; Stanley S. Toncich; Soon-Seng Lau, all of San Diego, CA (US)

(73) Assignee: Qualcomm Inc., San Diego, CA (US)

(*) Notice: Subject to any disclaimer, the term of this patent is extended or adjusted under 35 U.S.C. 154(b) by 0 days.

(21) Appl. No.: 09/387,139

(22) Filed: Aug. 31, 1999

Related U.S. Application Data

(60) Provisional application No. 60/127,499, filed on Apr. 2, 1999.

(51) Int. Cl.[7] .................................................. H04B 1/04
(52) U.S. Cl. ...................... 455/129; 455/13.4; 455/95; 455/522
(58) Field of Search ......................... 455/226.1, 226.2, 455/67.1, 69, 126, 127, 129, 12.1, 13.4, 522, 91, 95, 96, 97, 98, 99, 100, 107, 115, 572, 574, 575; 370/311, 316, 320, 342, 441

(56) References Cited

U.S. PATENT DOCUMENTS

| | | | |
|---|---|---|---|
| 5,267,262 A | | 11/1993 | Wheatley, III |
| 5,303,395 A | * | 4/1994 | Dayani ........................ 455/127 |
| 5,383,219 A | | 1/1995 | Wheatley, III et al. |
| 5,396,516 A | | 3/1995 | Padovani et al. |
| 5,483,680 A | * | 1/1996 | Talbot ......................... 455/107 |
| 5,564,086 A | * | 10/1996 | Cygan et al. ................. 455/129 |
| 5,691,974 A | | 11/1997 | Zehavi et al. |
| 5,732,335 A | | 3/1998 | Svensson |
| 5,862,458 A | * | 1/1999 | Ishii ............................ 455/107 |
| 6,122,490 A | * | 9/2000 | Hardman ..................... 455/129 |

FOREIGN PATENT DOCUMENTS

| | | |
|---|---|---|
| EP | 0558210 | 2/1993 |
| EP | 0692885 | 2/1994 |
| WO | 9851108 | 11/1998 |

* cited by examiner

*Primary Examiner*—Nay Maung
*Assistant Examiner*—Quochien B. Vuong
(74) *Attorney, Agent, or Firm*—Philip R. Wadsworth; Gregory D. Ogrod

(57) ABSTRACT

A system and method for controlling transmitted output power of hand held wireless devices used with external antenna units. Transmit power of information signals is controlled in the hand held device by obtaining design specification parameters of the antenna unit, which includes an output power measurement of the information signal transmitting from the antenna unit, which may also be referred to as an outdoor unit. The output power measurement is used by the hand held device, to adjust the power of the transmitted information signal. The output power measurement is determined in the antenna unit by obtaining a digital output power measurement, modulating the power measurement, and transmitting the modulated measurement signal to the hand held device. The modulated measurement signal is received by a cradle supporting the hand held device, or the device itself and demodulated. The hand held device uses the measurement to adjust the transmit power of the information signal.

15 Claims, 11 Drawing Sheets

SYSTEM AND METHOD FOR POWER MEASUREMENT IN OUTDOOR ANTENNA UNITS

CROSS-REFERENCE TO RELATED APPLICATIONS

This Appln claims benefit of Prov. No. 60/127,499 filed Apr. 2, 1999.

This application is related to commonly-owned applications, filed concurrently herewith, entitled "Power Output Control Of A Car Kit By A Coupled Wireless Device" having application serial number 09/387,143; "System And Method For Temperature Compensation Of External Antenna Units" having application serial number 09/387,138; and "System And Method For Constant Loop Gain In A Closed Loop Circuit" having application Serial No. 09/387,137, which are incorporated herein by reference.

BACKGROUND OF THE INVENTION

I. Field of the Invention

The present invention relates generally to mobile communication systems, and more particularly to a system and method for controlling transmitted output power of outdoor antenna units coupled to hand held wireless devices. The present invention is most applicable to wireless communication devices transmitting using code division multiple access (CDMA) modulation techniques where output power control is critical.

II. Related Art

Mobile telephone systems allow customers to establish communication links or place telephone calls from wireless devices such as portable or hand-held mobile phones. Calls initiated or received by wireless devices used in such systems are processed by a wireless communications network. One type of wireless network is a terrestrial cellular communication system communicating via a series of base stations and ground-based antennas that operate in the 800–1900 MHz range. Cellular communication systems limit the user to communication within a cell, which comprises a geographical service area to which the base station antennas can transmit. Users can move from cell to cell through known hand-off procedures that transfer calls from one cell to another. However, if no base station is within range of the mobile transmitter, such as in a rural area, a user cannot use the mobile telephone service.

Developments in mobile telephone system technology have led to wireless communication systems or networks that can transfer signals using a Low Earth Orbit (LEO) satellite system. The satellite systems can transmit and receive signals in rural areas as well as cities through the beams they project, and a user does not need to be within close range of a ground-based antenna. As a result, satellite communication systems are not limited to major cities as are cellular networks. In addition, each LEO satellite is capable of carrying a large number of user transmissions simultaneously. various satellite access schemes such as time division multiple access (TDMA) and code division multiple access (CDMA) allow concurrent access to LEO satellites by a large number of users.

The number of users that can be serviced by a wireless communication system, the system capacity, increases if the power output from each user's wireless device is decreased to the minimum power needed for quality transmission, and overhead or non-traffic messages or channel activity is reduced. This is the result of decreasing mutual interference between users, which is especially important in environments such as CDMA type communication systems. If one user's signal is too strong the quality of service for other users degrades due to increased interference. However, if the power of a user's signal becomes too low, the quality of service for that user becomes unacceptable. So, there is a desire to maintain as high a power level as possible to have higher quality service.

Thus, the number of users that may be provided service is increased by maintaining overhead power levels and each individual user's signals at the minimum levels needed for optimum performance. Therefore, the power output of wireless device transmissions are generally controlled using one or more power control methods to minimize interference and maximize communication link quality. Techniques for power control are discussed for example in U.S. Pat. No. 5,383,219, entitled "Fast Forward Link Power Control In A Code Division Multiple Access System," issued Jan. 17, 1995; U.S. Pat. No. 5,396,516, entitled "Method And System For The Dynamic Modification Of Control Parameters In A Transmitter Power Control System," issued Mar. 7, 1995; and U.S. Pat. No. 5,267,262, entitled "Transmitter Power Control System," issued Nov. 30, 1993, which are incorporated herein by reference. In addition, also see U.S. patent application Ser. No. 09/164,384 filed Sep. 30, 1998 entitled "System And Method For Optimized Power Control"; and Ser. No. 08/908,528, filed Aug. 7, 1997, entitled "Method And Apparatus For Adaptive Closed Loop Power Using Open Loop Measurements," which are incorporated herein by reference. The result is the communication system efficiently carries the substantially maximum number of individual user transmissions simultaneously.

Wireless devices, also referred to as user terminals, in current wireless communications systems may be any of several different types. One type is the portable unit, which is a hand-held device carried by the user and requires no external power source or antenna system. Another type is the mobile unit or station, which is typically fixed in a vehicle and operates like a desk type phone. A mobile unit has a separate unit (or "box") that is mounted in the vehicle and contains most of the transmitting and receiving circuits or hardware. A hand-held unit such as a phone handset, containing a keypad, speaker and microphone, is connected by one or more cables, conductors, or connectors to the box. A cradle is provided for supporting the handset unit when it is not in operation or when it is being used in a "hands free" mode. The box in turn is connected by a cable to an externally mounted "outdoor" antenna unit, which transmits and receives signals via a satellite or terrestrial cellular communications system or a base station or gateway.

A third type of user terminal combines the features of both a portable unit and a mobile unit. This type uses a hand-held device that can be used as a standalone unit away from the vehicle, and can be connected to a vehicle mounted assembly sometimes called a "car kit," for use in the vehicle. The car kit uses an external or outdoor unit (ODU) with an outdoor antenna to accommodate communications for the wireless device. A primary advantage of this combination unit or arrangement is that when the wireless device is used in the vehicle it can utilize additional power provided by the vehicle mounted electronics to establish a better and stronger communications link with satellite transceivers. It also allows conservation of internal battery power, drawing on vehicle provided power instead.

Satellite wireless telephone systems are particularly sensitive to outdoor or external antenna unit matching at the mobile unit due to potential path losses and a resulting difficulty in power control. The power output of the outdoor unit is calibrated against, or configured with, specific phone transmission circuits in mind. At present, a given car-kit is designed or calibrated in the factory to function with certain characteristics for phones with which it is to be connected. Once this designing or calibration (matching) takes place, the autonomous nature of phones and car kits is diminished because the phone is limited to being used with certain car kits or outdoor antenna units, such as specific models or manufacturers, having closely matched characteristics. This clearly sets certain constraints for mobile units or hand-held phones used with car kits in order to provide a closer match between the power output desired by the phone power control systems or methods, and the power actually being delivered by the outdoor unit.

Another limitation on phone autonomy is that software in the phone makes assumptions that all antenna units, or those it expects to be coupled to, have similar design characteristics. Yet, in the actual marketplace it is not uncommon that a user may have more than one portable phone or have one that can be used both as a standalone unit and as a mobile phone when placed in a cradle mounted in a vehicle. Also, a user may commonly upgrade his or her phone as new models come on the market, and have more than one car-kit. Therefore, the mobile unit employed with a car kit may change permanently or on a transient basis, creating potential undesirable matching problems.

One goal of the present invention is to allow a variety of hand-held wireless devices to be used with a given vehicle mounted, or fixed, outdoor antenna unit or "car kit," while maintaining a desired level of accuracy for the power output by the outdoor unit. Here, a given outdoor antenna unit is not calibrated against specific hand-held device characteristics in a factory, and hand held device software does not make any assumptions about antenna unit design characteristics. Instead, the antenna unit to which the hand held device is connected needs to inform the hand held device of its particular design characteristics. Yet, for improved or optimum performance, the outdoor antenna unit to which the hand-held wireless device is connected needs to inform the hand held device of its particular design characteristics. For example, the antenna unit power must be calibrated with the hand held device to which it is connected.

What is needed is a system and method for power control that provides design specification parameters (containing information about the antenna unit design characteristics) from the antenna unit to any hand held device to which the antenna unit is connected, while still allowing for an autonomous relationship between the hand held device and the antenna unit. The design specification parameters sent to the hand held device include information needed for the hand held device to operate in such a way as to optimize the performance of the antenna unit.

SUMMARY OF THE INVENTION

The present invention is a novel system and method for controlling transmit power in a hand held device. Multiple units for information signal transmission are utilized including: an antenna unit, a cradle, and any other units needed for transmission. With the present invention, transmit power is controlled by obtaining design specification parameters specific to the antenna unit and an output power measurement of the information signal transmitting from the antenna unit, also referred to as an outdoor unit. The outdoor unit design specification parameters are provided to the hand held device via a feedback loop to adjust the initial power of the information signal transmitting from the hand held device. Because the hand held device does not make any assumptions about the outdoor unit design characteristics, the present invention allows any hand held device to work with any outdoor unit by providing to the hand held device the design specification parameters of the outdoor unit.

The antenna unit of the present invention includes components for transmitting the information signal and components for obtaining an output power measurement of the information signal immediately prior to transmission. The hand held device comprises one or more transmit and receive components and a logic unit. The logic unit of the hand held device comprises a processor which processes software and a transmit power control. The software of the processor is initialized with the design specification parameters of the outdoor unit to operate the transmit power control in such a way as to optimize the performance of the outdoor unit. The hand held device interprets the output power measurement and adjusts the transmission power of the information signal accordingly.

The method of the present invention includes obtaining a digital output power measurement by the outdoor unit, modulating the digital power measurement, and transmitting the modulated measurement signal to the hand held device. The method of the present invention also includes receiving the modulated measurement signal by a cradle or hand held device, demodulating the measurement signal, and adjusting by the hand held device the transmit power of the information signal.

The system and method of the present invention allow control of the initial transmit power of the information signal from the hand held device in order to limit the output power of the signal transmitted from the hand held device to the power needed for high quality transmission. Efficient use of power by limiting the output power from the hand held device allows the maximum number of individual user transmissions to be carried by in a wireless communication system.

BRIEF DESCRIPTION OF THE DRAWINGS

The features, objects and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

With the system and method of the present invention, hand held wireless devices and antenna units remain autonomous because the hand held device does not make the assumption that all outdoor units have similar design characteristics. The present invention enables the antenna unit to provide its design specification parameters to the hand held device to inform it of the particular design characteristics of the antenna unit to which it is currently connected. With the present invention, transmit power is controlled in the hand held device. The transmit power is controlled by obtaining an output power measurement of an information signal transmitting from an outdoor unit and using the output power measurement to adjust the power of the transmitted information signal in the hand held device.

One embodiment of the present invention is in a car kit that comprises an external antenna unit, also referred to as an outdoor unit or ODU, that mounts to the exterior of a vehicle, such as the trunk or roof of a car or truck and a cradle. A hand held (holdable, portable) wireless device interfaces with the car kit to make and receive calls, or establish various communication links. The car kit operates in a wireless satellite communications system, preferably one that uses Low Earth Orbit (LEO) satellites. However, it would be apparent to one skilled in the relevant arts that other satellite systems, such as ones using Medium Earth Orbit (MEO) satellites, or geosynchronous (GEO) satellites, could also be used with this invention. The invention may also prove useful in some terrestrial communication systems where car kit power losses or differences unacceptably effect the control of output power.

Figure 1:
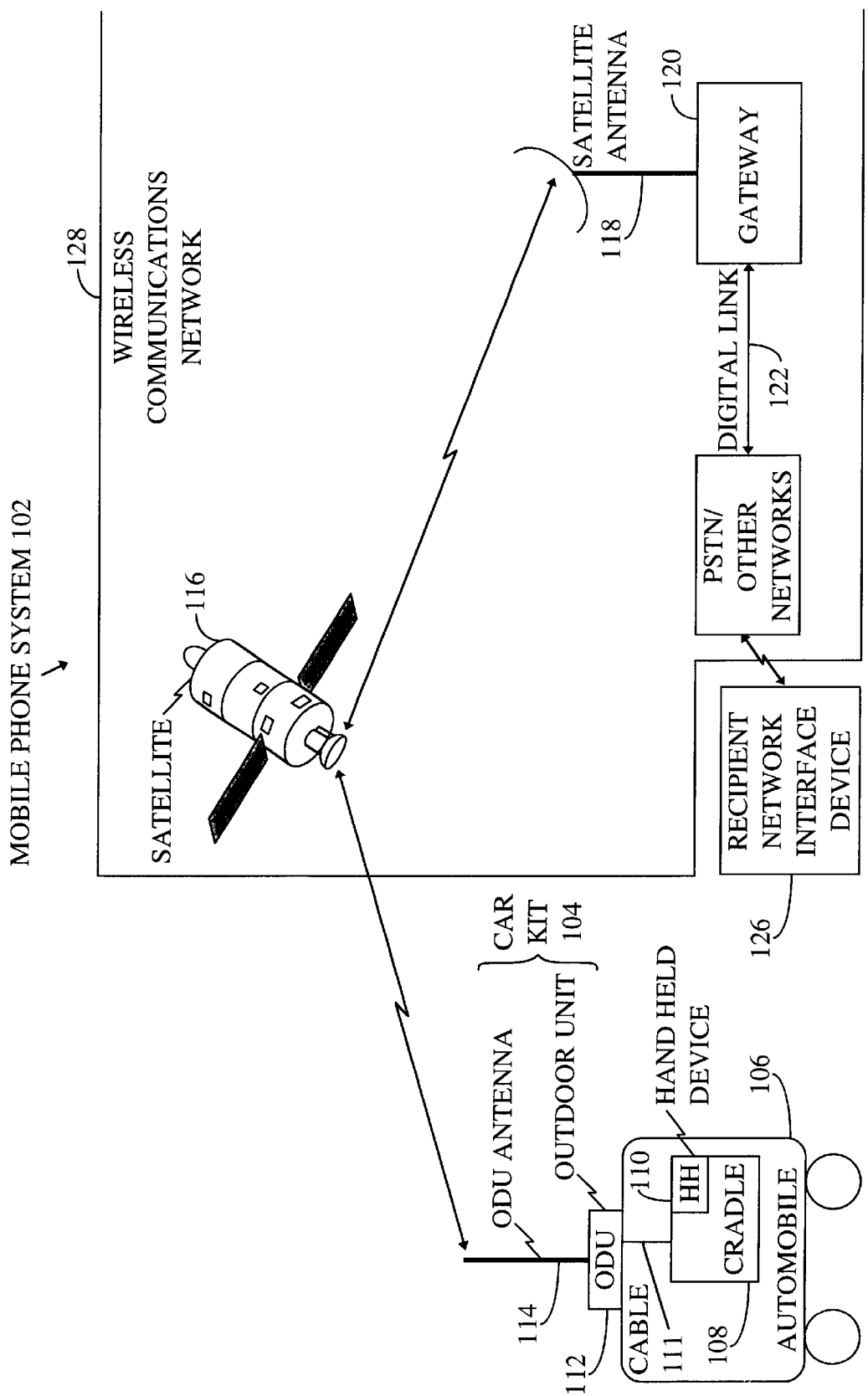
FIG. 1 is a block diagram of a mobile phone system according to a preferred embodiment of the present invention.

FIG. 1 is a block diagram of an exemplary wireless mobile phone system 102, in which the present invention may be used. Such communication systems are discussed in U.S. Pat. No. 4,901,307, issued Feb. 13, 1990, entitled "Spread Spectrum Multiple Access Communication System Using Satellite or Terrestrial Repeaters;" U.S. Pat. No. 5,691,974, which issued Nov. 25, 1997, entitled "Method and Apparatus for Using Full Spectrum Transmitted Power in a Spread Spectrum Communication System for Tracking Individual Recipient Phase Time and Energy;" and U.S. patent application Ser. No. 09/120,859 filed Jul. 21, 1998, entitled "System And Method For Reducing Call Dropping Rates In A Multi-Beam Communication System," all of which are assigned to the assignee of the present invention, and are incorporated herein by reference.

Mobile phone system 102 comprises one or more car kits 104, hand-held wireless devices 110 and a wireless communications network 128 comprising equipment related to wireless communication service. Wireless device 110 is mounted in or coupled to a car kit 104. Car kit 104 is mounted in a vehicle, such as an automobile or truck, 106. Car kit 104 includes a cradle 108, a cable 111, an outdoor unit (ODU) 112, and an ODU antenna 114. Hand held device 110 can rest in or be removed from cradle 108. It is anticipated and will be readily understood by those skilled in the art, that the "car kit" and ODU represent elements that can be used in non-vehicular arrangements as well, such as for fixed remote communication applications in or around structures where unit mobility is occasionally exploited or increased power is sometimes desired.

Connection of the elements of car kit 104 will next be illustrated. Cradle 108 is connected to ODU 112 by cable 111. ODU 112 mounts to an exterior surface of vehicle 106. Antenna 114 is attached to the top of ODU 112. Hand held device 110 (HH) may rest within cradle 108, whereby it is electrically connected to ODU 112 through cradle 108 directly, by inductive coupling, or via a wire connection in a well known manner. When a wire connection is used, hand held device 110 may be removed from its resting position within cradle 108 by a user to initiate or receive a call and still remain electrically connected to car kit 104. In addition, hand held device 110 may be unplugged from cradle 108 and taken outside vehicle 106, or other structure, for stand-alone use. In that event, hand held device 110 is electrically disconnected from car kit 104 and does not utilize any features that are incorporated in car kit 104.

Cradle 108 remains within automobile 106 and ODU 112 remains fixed to vehicle 106. Mobile phone system 102 transmits to and receives signals from an antenna 118 connected with a ground base station, hub, or gateway 120 via satellite 116 providing service for an area wireless device 110 is located in, in a manner known to persons skilled in the relevant arts, and disclosed in the patents referenced above. A gateway provides communication links for connecting a wireless device, also referred to as a user terminal, to other user terminals or users of other communication systems, such as a public switched telephone network.

Hand held device 110 constantly, or on a pre-selected periodic basis, adjusts the power of transmitted signals during a call or communication link using the power measurement of the present invention. Signal transmission between the mobile phone system 102 and a recipient 126 is illustrated in FIG. 2 which is a flowchart illustrating an overview of a call process.

Operation of the mobile phone system 102 includes sending information signals between hand held device 110 and a recipient device 126 via the components within the wireless communications network 128 (as described in reference to FIG. 1 above) in order to transmit information, such as a digitized representation of a voice.

Figure 2:
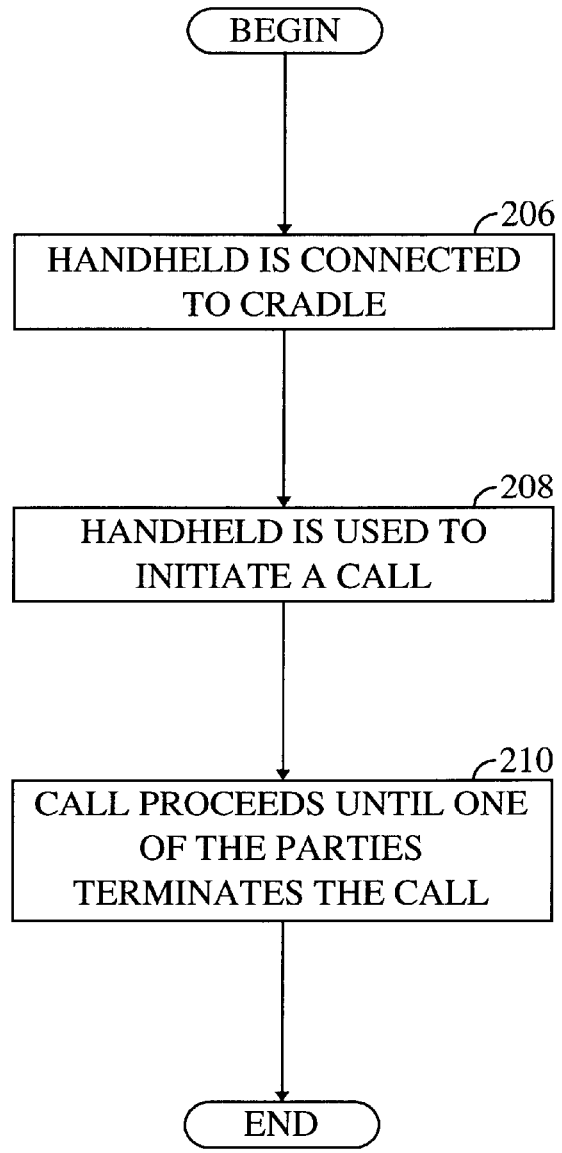
FIG. 2 is a flowchart illustrating an overview of the call process according to a preferred embodiment of the present invention.

The flowchart in FIG. 2 begins with step 206. In step 206, hand held device 110 is connected to cradle 108. Hand held device 110 has two modes of operation, as a standalone unit and as a hand set plugged into cradle 108. When hand held device 110 operates as a standalone unit, it transmits and receives via satellite 116 using a hand held antenna (not shown). When hand held device 110 is used within vehicle 106 and is connected to cradle 108, it transmits and receives via ODU 112.

In order to allow a variety of hand held devices 110 to work with any ODU 112 when hand held device 110 is connected to cradle 108, ODU 112 sends information about its design specification parameters to hand held device 110 to inform hand held device 110 of the particular design characteristics of ODU 112. The design specification parameters are passed to a processor in hand held device 110, that makes no assumptions about ODU design characteristics before it receives the design specification parameters from ODU 112 itself. The process of how the processor, typically using software, in hand held device 110 utilizes the design specification parameters to adapt to the particular ODU 112 will be described later in reference to FIG. 11.

Notification of the particular ODU 112 design characteristics allows hand held device 110 to ensure that the transmit power of the information signal does not exceed the design criteria of any of the components within ODU 112 thereby preventing damage to components of ODU 112. It also allows more appropriate control over the output power of ODU 112 to achieve desired power levels. The initiation process provides hand held device 110 with the information it needs to limit the power of a transmit signal to that which will not damage ODU 112, or to choose the appropriate power level. The choice of model and vendor of hand held device 110 may be independent of the choice of model and vendor of ODU 112. The initiation process that occurs when hand held device 110 is plugged into cradle 108 is described in further detail with respect to FIG. 6.

In step 208, a caller initiates a call via hand held device 110. A user initiates a call via hand held device 110 by entering digits into the keypad specifying a particular destination number and then entering send using the keypad. For example, a user may enter a destination number, also referred to as a telephone number, using the keypad of hand held device 110. Destination numbers are numbers used by components of wireless communications network 128 to identify recipient network interface device 126.

Call initiation proceeds with hand held device 110 transmitting an information signal to gateway 124. The information signal includes information used to establish and terminate the call. Typically multiple information signals are sent. These signals follow standards established by the industry such as such as the well known IS-95 standard for wireless communication or other standards known to those skilled in the relevant art. Information signals also include digital representations of voice, data transmitted via personal computers, and digitized versions of the content on pages transmitted via facsimile.

Call initiation continues with gateway 124 interpreting the information signal and responding. Gateway 124 contains the capability to analyze signals received from hand held device 110, interpret the signals, and switch the call to other components within wireless communications system 128. For example, if a caller wants to place a call to a recipient device 126, say another user terminal or a wireline phone, using hand held device 110, the caller inputs the destination number corresponding to recipient device 126. The destination number is received by gateway 124 which determines the switching that is needed to complete the call to recipient network interface device 126. Signaling proceeds until the call is initiated to recipient network interface device 126.

In step 210, the call proceeds until one of the parties terminates the call. Information signals sent during the call may contain a digitized voice, facsimile data, or any other data that may be transmitted via a communications network. Whether hand-held device 110 originates or responds to a call, during the call, hand held device 110 adjusts the transmit power of the information signals as the data rate changes, or as the path loss or signal attenuation changes, in accordance with known power control techniques or algorithms, as discussed above. In addition, hand held device 110 adjusts the transmit power to compensate for car kit 104 losses. Because the signal must transmit through cable 111 and ODU 112 before transmitting via ODU antenna 114, losses result in a difference between the power of the initial transmit signal and the power output from ODU 112. Hand held device 110 needs to know the difference between the output power from ODU 112 and the power of the initial transmitted signal in order to adjust the initial transmit power to achieve the desired power output from ODU 112. The needed design specification parameters, which includes power measurement information, are provided to hand held device 110 via a power feedback loop. The process for providing the information is described in further detail with respect to FIG. 7.

Figure 3:
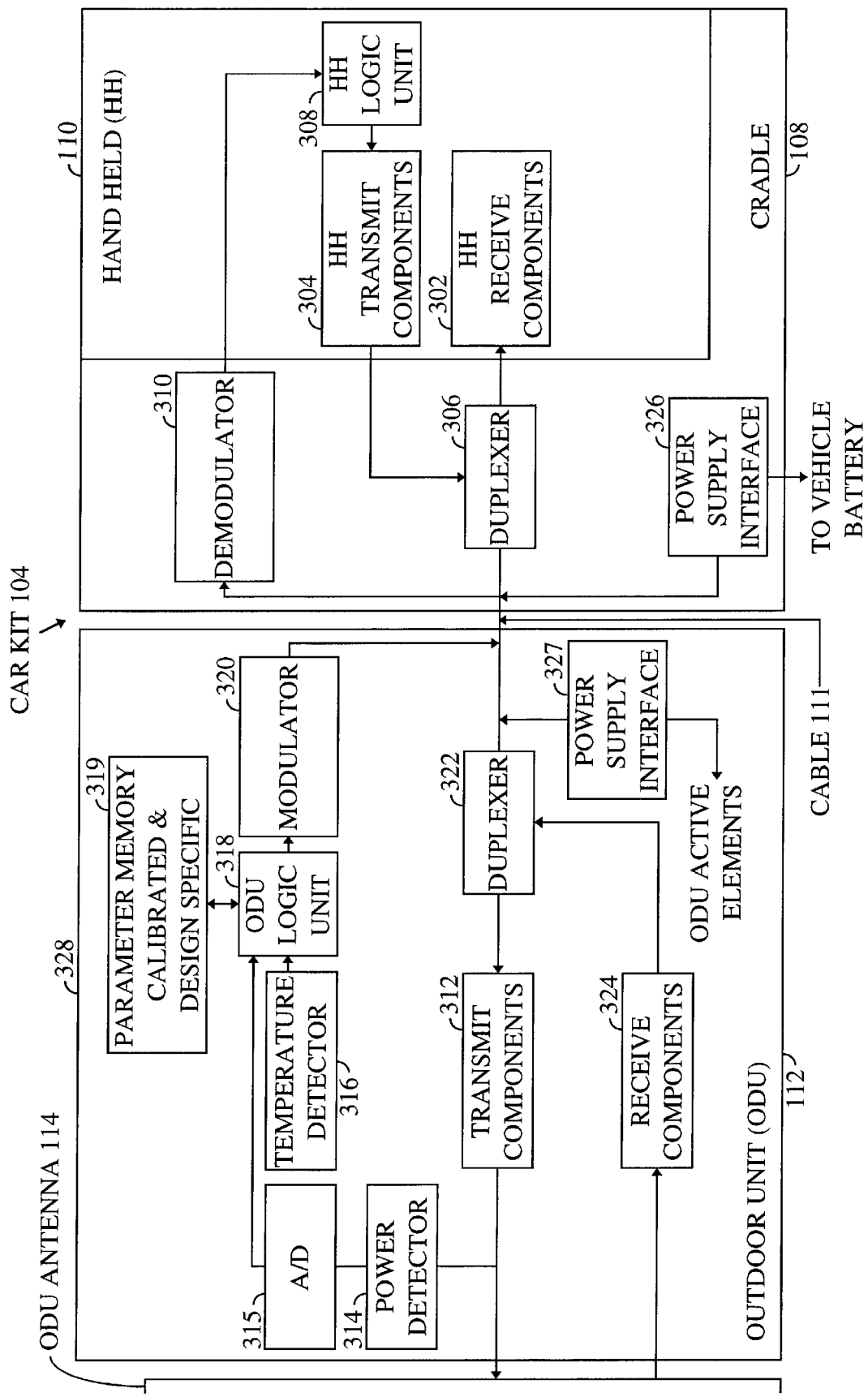
FIG. 3 is a block diagram of a car kit according to a preferred embodiment of the present invention.

FIG. 3 is a block diagram of car kit 104. Car kit 104 comprises components to transmit and receive via satellite 116 in order to communicate with gateway 120 or a wireless communications system. Car kit 104 interfaces with a hand held device 110 connected to cradle 108. Cradle 108 is connected to outdoor unit 112 by cable 111. ODU antenna 114 is connected to ODU 112.

Hand held device 110 comprises hand held (HH) receive components 302 and HH transmit components 304. In addition, in order to control power, hand held device 110 comprises a HH logic unit 308.

Cradle 108 includes a duplexer 306, a demodulator 310 and a power supply interface 326.

Outdoor unit 112 comprises ODU power control components 328. ODU power control components 328 include ODU transmit components 312, a duplexer 322, ODU receive components 324, a power detector 314, an analog-to-digital (A/D) converter 315, a temperature detector 316, an ODU logic unit 318, a modulator 320, and a power supply interface circuit 327, to power active elements within ODU 112.

The connection between hand held device 110 and cradle 108 will be described next. Logic unit 308 is connected to demodulator 310 in order to receive the power measurement from ODU 112. Logic unit 308 is also connected to HH transmit components 304 in order to provide information for the adjustment of the transmit power of the signal. HH transmit components 304 are connected to duplexer 306 which provides connection to cable 111. Duplexer 306 is also connected to HH receive components 302 so that HH receive components 302 can receive the signal from satellite 116 via cable 111 into hand held device 110. Power supply interface 326 within cradle 108 is connected to the link between hand held device 110 and cable 111. In addition, power supply interface 326 is connected to the vehicle battery (not shown) to provide a source of power for cradle 108 and/or outdoor unit 112.

Cable 111 is connected to duplexer 322 within ODU 112. Duplexer 322 is also connected to transmit components 312 and receive components 324 within ODU 112.

The output of ODU transmit components 312 is connected to ODU antenna 114. ODU power control components 328 are connected as a feedback loop from the output of transmit components 312 to cable 111.

Within the ODU power control components feedback loop, power detector 314 is connected to the output of transmit components 312 to detect the power of the signal output from transmit components 312. The output of power detector 314 is connected to ODU logic unit 318 (via A/D converter 315) so that detected power can be converted into a digital power measurement. Temperature detector 316 is connected to ODU logic unit 318 in order to provide a temperature measurement for improved estimation of the power. The output of ODU logic unit 318 is connected to the input of modulator 320 for modulation of the power measurement. The output of modulator 320 is connected to cable 111. Thus, the signal is sent from modulator 320 back to cradle 108 via cable 111.

In the alternative, temperature and power measurements can be maintained as analog values and transferred using known data modulation techniques for modulating measurement values on a carrier, such as is commonly used in modem communications over wireline links. The temperature and power measurement values are then recreated by demodulator 310. Such techniques are well understood in the art.

Duplexer 322 in ODU 112 and duplexer 306 in cradle 108 allow connection between multiple circuits. The interfaces may be implemented using duplexers manufactured by Murata, such as Murata's duplexer model number DSY21R61C2R49BHB. In an alternate embodiment, car kit 104 includes a cellular link (not shown). In the alternate embodiment, triplexers are used in place of duplexers 322 and 306 in order to connect three links including the satellite transmit, satellite receive, and cellular links. The alternate embodiment, the circuit arrangement of which would be readily apparent to one skilled in the relevant arts, allows the mobile phone to be used in either a terrestrial cellular system or a satellite communications system.

Implementation of ODU power control components 328 will be described next. Power detector 314 may be implemented with a full-wave zero bias Schottky diode detector (ZBS) model number HSMS2852, manufactured by Hewlett Packard. In one embodiment of the present invention, the power detector design specifications include providing at least 25 db dynamic range, having power estimation errors of ±0.5 db from 27–35 dbm, a power estimation time of 1 millisecond, and operating at temperatures of −20° C. to +60° C. ambient. The output of power detector 314 is input to A/D converter 315 which uses a 16-bit single slope conversion and is recalibrated every second. A/D converter 315 is connected to ODU logic unit 318. ODU logic unit 318 may be a microprocessor which runs at 13.125 MHz.

Figure 4:
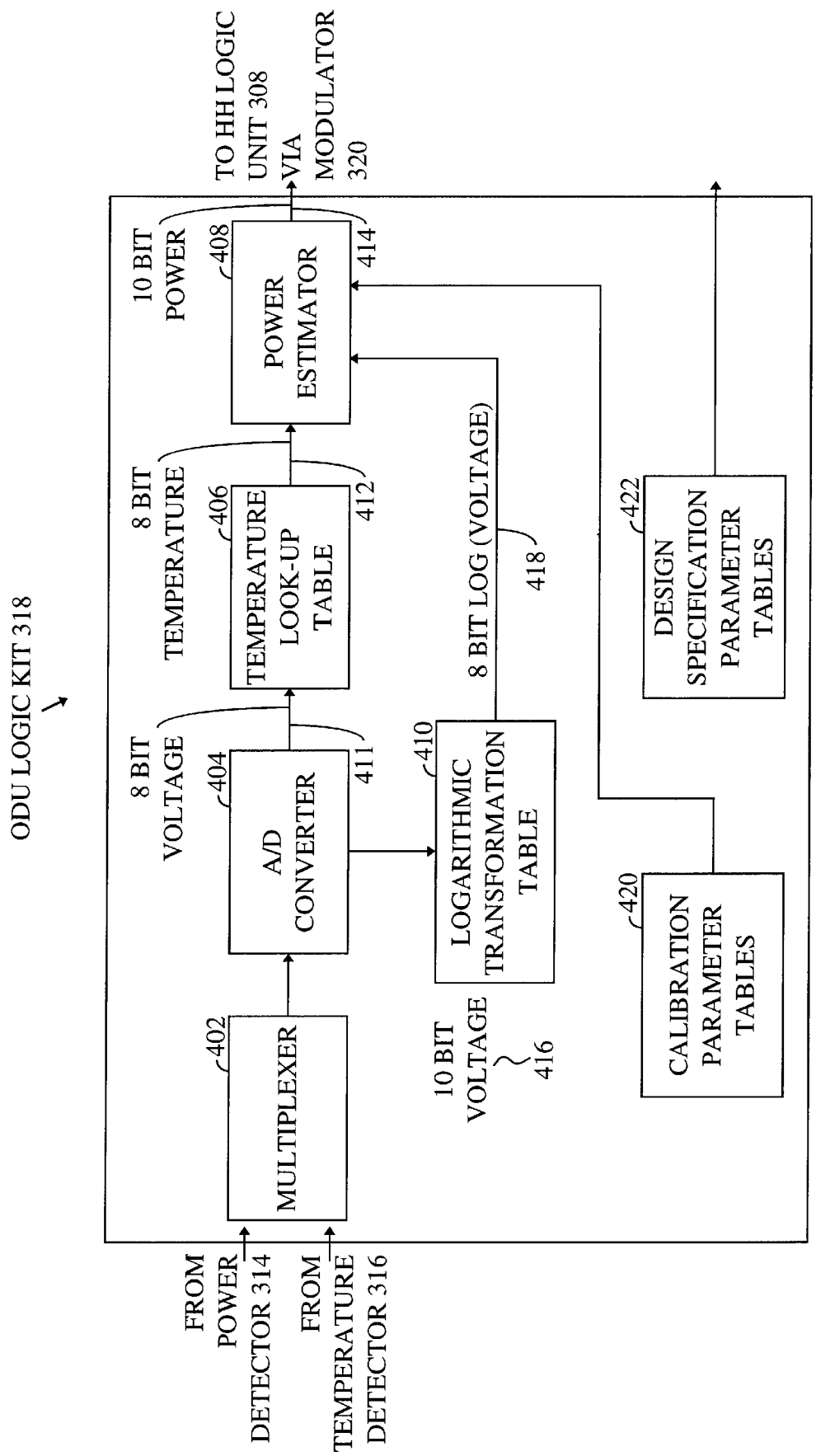
FIG. 4 is a block diagram of an ODU logic unit according to a preferred embodiment of the present invention.

FIG. 4 illustrates a block diagram of ODU logic unit 318. ODU logic unit 318 comprises one or more processors and storage media. Within ODU logic unit 318 are: a multiplexer 402, an analog-to-digital (A/D) converter 404, a temperature look-up table 406, a logarithmic transform table 410, a power estimator 408, calibration parameter tables 420, and design specification parameter tables 422.

ODU logic unit 318 comprises one or more processors that have the capability of processing computer software in the form of lines of executable code comprising commands from a computer programming language residing in a storage medium. The processors may comprise processing capability dispersed among one or more processing chips, application specific integrated circuits (ASICs), or any other hardware capable of processing computer software. In addition, ODU logic unit 318 includes a storage medium.

Storage medium, also referred to as memory, is any storage medium which includes long term memory, non volatile memory, removable memory such as floppy disk or any other memory that can be used to store computer code or information processed by computer software. The storage medium may be dispersed among one or more hardware storage medium components. In one embodiment of the present invention, ODU logic unit 318 is implemented with a microcomputer which runs at 13.125 MHz. The microcomputer is versatile and allows for future expansion.

Signals from power detector 314 and temperature detector 316 are input into multiplexer 402 within ODU logic unit 318. The output of multiplexer 402 is connected to A/D converter 404 where the multiplexed temperature and power information is converted to digital format. The output of A/D converter 404 is connected to temperature look-up table 406 and logarithmic transformation table 410. Temperature look-up table 406 and logarithmic transformation table 410 are connected to power estimator 408. Power estimator 408 is connected to modulator 320 to send the estimated power to modulator 320 for modulation and transmission via cable 111. The process of obtaining a digital power measurement will be described in further detail with respect to FIG. 8.

Multiplexer 402 receives input from power detector 314 and temperature detector 316 and multiplexes the signals into one output signal. Multiplexing techniques such as those known to those skilled in the art are used to multiplex the signals.

The resulting multiplexed signal is sent from multiplexer 402 to A/D converter 404. In a preferred embodiment, a 16 bit single slope A/D converter is used. However, those skilled in the art will readily recognize that the invention is not limited to a 16 bit A/D converter and that other such elements can be used within the teachings of tthe invention having other bit widths or slopes, as desired. The preferred implementation of A/D converter 404 is recalibrated every second using an internal bandgap reference.

Temperature look-up table 406 and logarithmic transformation table 410 are 256 level tables residing in memory. Temperature look-up table 406 converts an 8 bit voltage obtained from temperature detector 316 into an 8 bit temperature. Logarithmic transformation table 410 converts a 10 bit voltage into an 8 bit log (voltage).

Neither the look-up table 406 nor logarithmic transformation table 410 are limited to 256 levels. The voltage obtained from temperature detector 316 can be represented by a digital word length other than 8 bits. The logarithmic transformation table is not constrained to operate with a 10 bit word length, nor to provide an 8 bit log (voltage) output. The illustrated word lengths are for purposes of illustration and other word lengths can be used, depending on desired resolution, as will be clear to those skilled in the art.

Power estimator 408 receives the 8 bit temperature and the 8 bit log (voltage) and converts them into a 10 bit absolute power estimation (in dbm). The power estimation is determined by using voltage-temperature correlation equations shown below.

$$P_{in}(V_g, T_g) = B_0 + B_1 T_g + B_2 T_g^2 + B_3 T_g^3 + \ldots + B_k T_g^k + \\ C_{1,1} V_g T_g + C_{1,2} V_g T_g^2 + C_{1,3} V_g T_g^3 + \ldots + C_{1,k} V_g T_g^k + \ldots \\ + C_{m,1} V_g^m T_g + C_{m,2} V_g^m T_g^2 + C_{m,3} V_g^m T_g^3 + \ldots + C_{m,k} V_g^m T_g^k \qquad (1)$$

-continued $$\begin{bmatrix} 1 & V_{g,1} & V_{,1} & V_{,1} & T_1 & T & T & V_{g,1}T_1 & V_{g,1}T & V_{g,1}T \\ 1 & V_{g,2} & V_{,1} & V_{,2} & T_2 & T & T & V_{g,2}T_2 & V_{g,2}T & V_{g,2}T \\ 1 & V_{g,3} & V_{,3} & V_{,3} & T_3 & T & T & V_{g,3}T_3 & V_{g,3}T & V_{g,3}T \\ 1 & V_{g,4} & V_{,4} & V_{,4} & T_4 & T & T & V_{g,4}T_4 & V_{g,4}T & V_{g,4}T \\ 1 & V_{g,5} & V_{,5} & V_{,5} & T_5 & T & T & V_{g,5}T_5 & V_{g,5}T & V_{g,5}T \\ \vdots & \vdots & \vdots & \vdots & \vdots & \vdots & \vdots & \vdots & \vdots & \vdots \\ \vdots & \vdots & \vdots & \vdots & \vdots & \vdots & \vdots & \vdots & \vdots & \vdots \\ \vdots & \vdots & \vdots & \vdots & \vdots & \vdots & \vdots & \vdots & \vdots & \vdots \\ 1 & V_{g,N} & V_{,N} & V_{,N} & T_N & T & T & V_{g,N}T_N & V_{g,N}T & V_{g,N}T \end{bmatrix} \begin{bmatrix} A_0 \\ A_1 \\ A_2 \\ A_3 \\ B_1 \\ B_2 \\ B_3 \\ C_1 \\ C_2 \\ C_3 \end{bmatrix} = \begin{bmatrix} P_1 \\ P_2 \\ P_3 \\ P_4 \\ P_5 \\ \vdots \\ \vdots \\ \vdots \\ P_N \end{bmatrix} \quad (2)$$

Calibration coefficients are determined at the calibration temperature using the equation below. Calibration coefficients stored in calibration parameter tables 420 are used with the calibration temperature.

$$\begin{bmatrix} 1 & V_{g,1} \\ 1 & V_{g,2} \\ 1 & V_{g,3} \\ \vdots & \vdots \\ \vdots & \vdots \\ 1 & V_{g,N} \end{bmatrix} \begin{bmatrix} A_0 \\ A_1 \end{bmatrix} = \begin{bmatrix} G_1 \\ G_2 \\ G_3 \\ \vdots \\ \vdots \\ G_N \end{bmatrix} \quad (3)$$

Design specification parameter tables 422 are connected to modulator 320 to provide design specification parameters to hand held device 110 during the initiation process that occurs when hand held device 110 is plugged into cradle 108. The initiation process will be described in more detail with respect to FIG. 6.

Design specification parameters are stored in the design specification parameter tables 422. Design specification parameters are the design characteristics of ODU 112. These design specification parameters inform hand held device 110 of limitations needed in the initial transmit power in order to avoid damaging ODU 112. Design specification parameters often are characteristics of the power amplifier in the ODU 112 which is an expensive ODU component within transmit components 312. Design specification parameters include, among others, maximum gain deviation, power detector minimum accurate power, power amplifier supply voltage, power amplifier hi/low bias versus frequency, maximum effective isotropic radiated power (EIRP) versus frequency, maximum effective isotropic radiated power (EIRP) backoff, and gain compression.

The calibration and design parameter, and other, tables can be conveniently implemented as a variety of memory storage devices such as ROM or RAM circuits. One type of implementation is an EEPROM circuit which allows programming and reprogramming of information without being volatile and subject to loss when the power is disconnected, as would happen in vehicular applications. Not all of the information needs to be stored in the same location. Since information may change over time, or be updated at a later date, it may be convenient to make some of the memory removable/replaceable, and possibly located separate from ODU Logic unit 318. Therefore, a separate or additional memory 319 is shown I FIG. 3 for this purpose.

The advantage of supplying the design specification parameters of the ODU 112 to the hand held device 110 is that hand held device 110 makes no assumptions about ODU 112. This allows for an individual hand held device 110 to be used with multiple ODUs 112, where each ODU 112 has different design specifications. For example, the range of maximum output power for ODUs varies. An example of this range is from +10 dbm to +33 dbm. There may be certain circumstances where one output power is more desirable over another. Therefore, the present invention allows a single hand held device 110 to adaptively change its software in order to work with any ODU 112. The initialization process of the software of hand held device 110 is discussed below in reference to FIG. 11.

Figure 5:
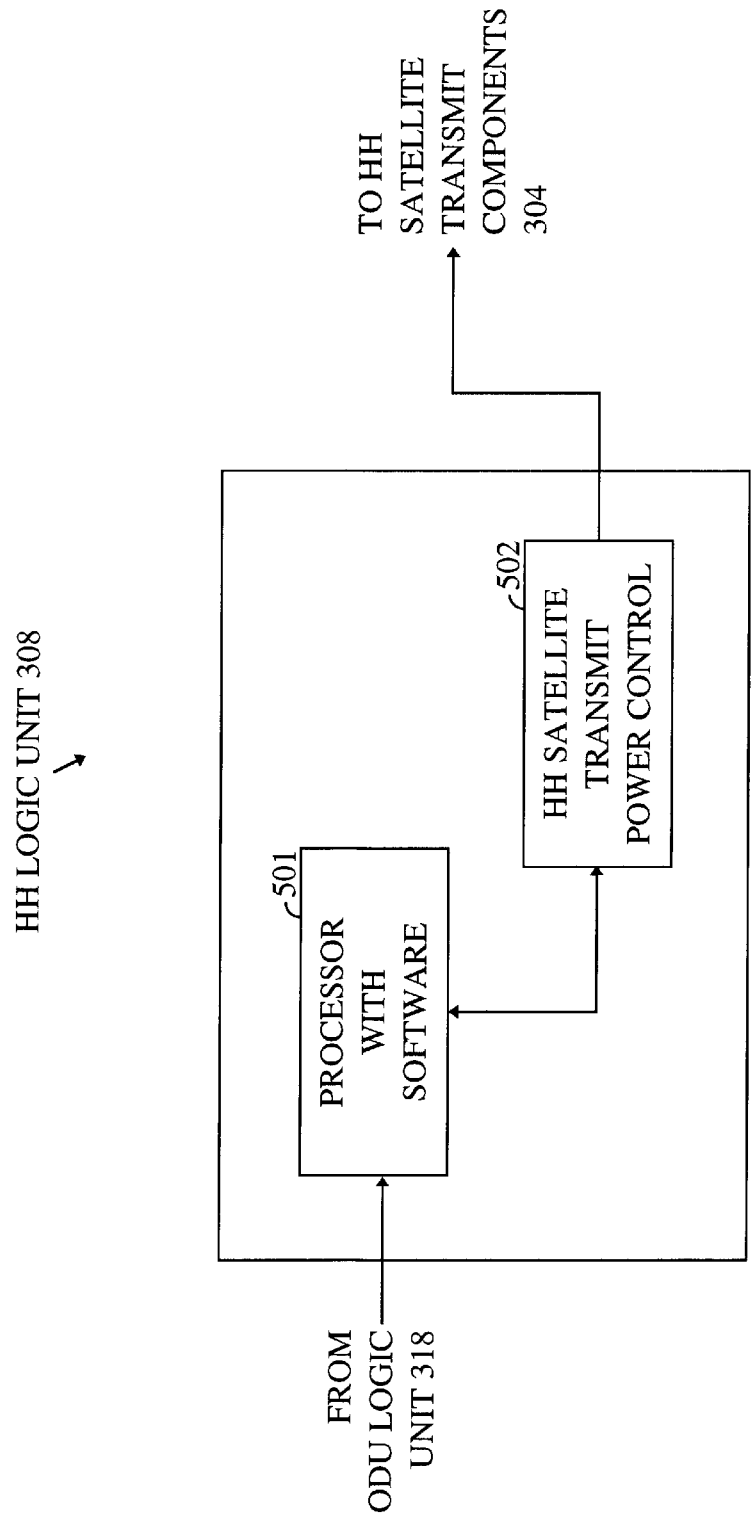
FIG. 5 is a block diagram of a hand held logic unit according to a preferred embodiment of the present invention.

FIG. 5 is a block diagram of HH logic unit 308. Logic unit 308 comprises one or more processors that may have the capability of processing computer software in the form of lines of executable code of a computer programming language residing in storage medium. Processors may actually constitute processing capability dispersed among one or more processing chips, application specific integrated circuits (ASICs), or any other hardware capable of processing computer software. In addition, logic unit 308 includes a storage medium. In one embodiment, logic unit 308 is implemented with an Intel 386 microcomputer. The Intel 386 microcomputer is capable of processing many tasks which is necessary for operation of hand held device 110.

Within FIG. 5 is a processor 501 that processes software and a transmit power control 502. Processor 501 is connected to ODU logic unit 318 and HH transmit power control element 502. The software processed by processor 501 makes no assumptions about ODU 112 design characteristics until it receives the design specification parameters from ODU logic unit 318. Processor 501 of the present invention, via software, utilizes the design specification parameters of ODU 112 to operate transmit power control 502 in such a way as to substantially optimize the performance of ODU 112.

Transmit power control 502 is connected to HH transmit components 304. The software in processor 501 is initialized by the power measurement and design specification parameters received by processor 501 from ODU logic unit 318. Once the software in processor 501 is initialized with the design specification parameters, processor 501 controls transmit power control 502 to perform processing. Transmit power control 502 sends signals for controlling transmit power to transmit components 304. The process for controlling power is described in further detail with respect to FIG. 7. The execution of processor 501 with the software initialized with the design specification parameters operates to send appropriate limitations to transmit power control 502. The process for initiating hand held device 110 is described in further detail with respect to FIG. 6.

Figure 6:
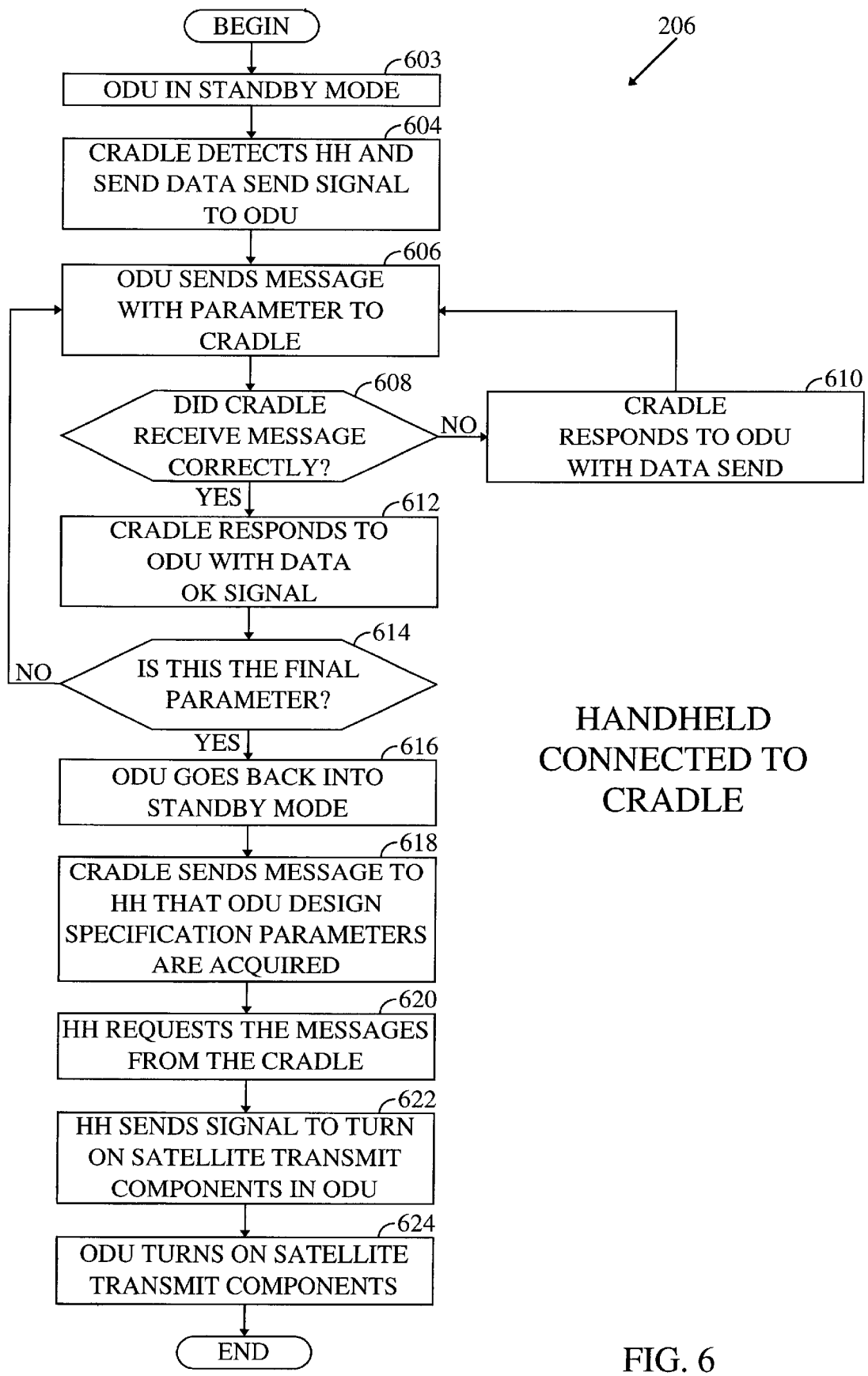
FIG. 6 is a flowchart illustrating the operation of connecting a hand held to a cradle according to a preferred embodiment of the present invention.

FIG. 6 is a detailed flowchart of step 206 illustrating the operation of providing hand held device 110 with information to establish initial transmit power when hand held device 110 is connected to cradle 108. The design specification parameter tables 422 within ODU logic unit 318 contain the design specification parameters for ODU 112. The design specification parameters are sent from ODU 112 to hand held device 110 when hand held device 110 is plugged into cradle 108. This allows the selection of the model and vendor of hand held device 110 to be independent of ODU 112.

The flowchart in FIG. 6 begins with step 603. In step 603, ODU 112 is in standby mode until cradle 108 initiates communication. In step 604, cradle 108 detects hand held device 110 and cradle 108 sends a data send signal to ODU 112. The data send signal indicates to ODU 112 that hand held device 110 is plugged into cradle 108 and is ready to receive the design specification parameters.

In step 606, ODU 112 sends a message with a design specification parameter to cradle 108. One design specification parameter is sent in response to a data send signal. The design specification parameter is any one of the design specification parameters that has not been already sent to hand held device 110 during this initiation process. Design specification parameters include maximum gain deviation, power detector minimum accurate power, power amplifier supply voltage, power amplifier hi/low bias versus frequency, maximum effective isotropic radiated power (EIRP) versus frequency, maximum EIRP backoff, gain compression, propagation delay between hand held device and unit transmit antenna, propagation delay between hand held device and unit receive antenna, transmit gain, and receive gain, and any other design specification parameter that hand held device 110 needs to know in order to establish an initial transmit power that will not damage any components in ODU 112, or will be appropriate to produce desired power levels in the communication system (low interference, high quality).

In some embodiments the initial output power for hand held device 110 is set arbitrarily low, such that no other receiver is expected to receive the signal, this assures that the ODU is not overpowered by the output signal. The process of the invention then operates to achieve an important function of setting the output power to a desired (more useful) level as quickly as possible while conforming to any system constraints such as emission levels set by government agencies, or desired interference levels in the communication system. It is generally undesirable to have hand held device 110 or ODU 112 simply start at a very high power level even if that is ultimately what is chosen.

In step 608, it is determined whether or not cradle 108 received the message. If, in step 608, it is determined that cradle 108 did not receive the message, the processing of the method proceeds to step 610. If it has been determined in step 608 that cradle 108 received the message, the method proceeds to step 612.

In step 610, cradle 108 responds to ODU 112 with a data send signal. This alerts ODU 112 to resend the design specification parameter that was sent. After step 610 is complete, processing flow returns to step 606.

In step 612, cradle 108 responds to ODU 112 with a data OK signal. The data OK signal indicates to ODU 112 that the design specification parameter was received by cradle 108.

In step 614, it is determined whether or not this is the final design specification parameter. If this is the final design specification parameter, processing proceeds to step 616. If this is not the final design specification parameter, processing proceeds to step 606 to send the next design specification parameter.

In step 616, ODU 112 goes back into standby mode. In step 618, cradle 108 sends a message to hand held device 110 that ODU 112 design specification parameters have been acquired. The design specification parameters are used by logic unit 308 to determine limitations needed in the initial transmit power to ensure that components within ODU 112 are not damaged, or appropriate output power levels are achieved. In step 620, hand held device 110 requests the first message from cradle 108.

In step 622, hand held device 110 sends a signal (via cradle 108) to turn on transmit components 312 in ODU 112. Logic unit 308 sends a signal to turn on transmit components 312 within ODU 112 so that ODU 112 is ready for transmission of the information signal. HH transmit components 304 control the initial power of the transmit signal so that the signal that is sent does not exceed the power that can be accepted by ODU transmit components 312. For example, ODU transmit components 312 include a power amplifier. The power amplifier is typically the most expensive component of ODU transmit components 312. Thus, the present invention ensures that all signals sent to the power amplifier does not exceed the power that it can accept without being damaged.

Finally, in step 624, ODU transmit components 312 are prepared for service. Transmit components 112 are activated or turned on and are ready to transmit the signal.

Figure 7:
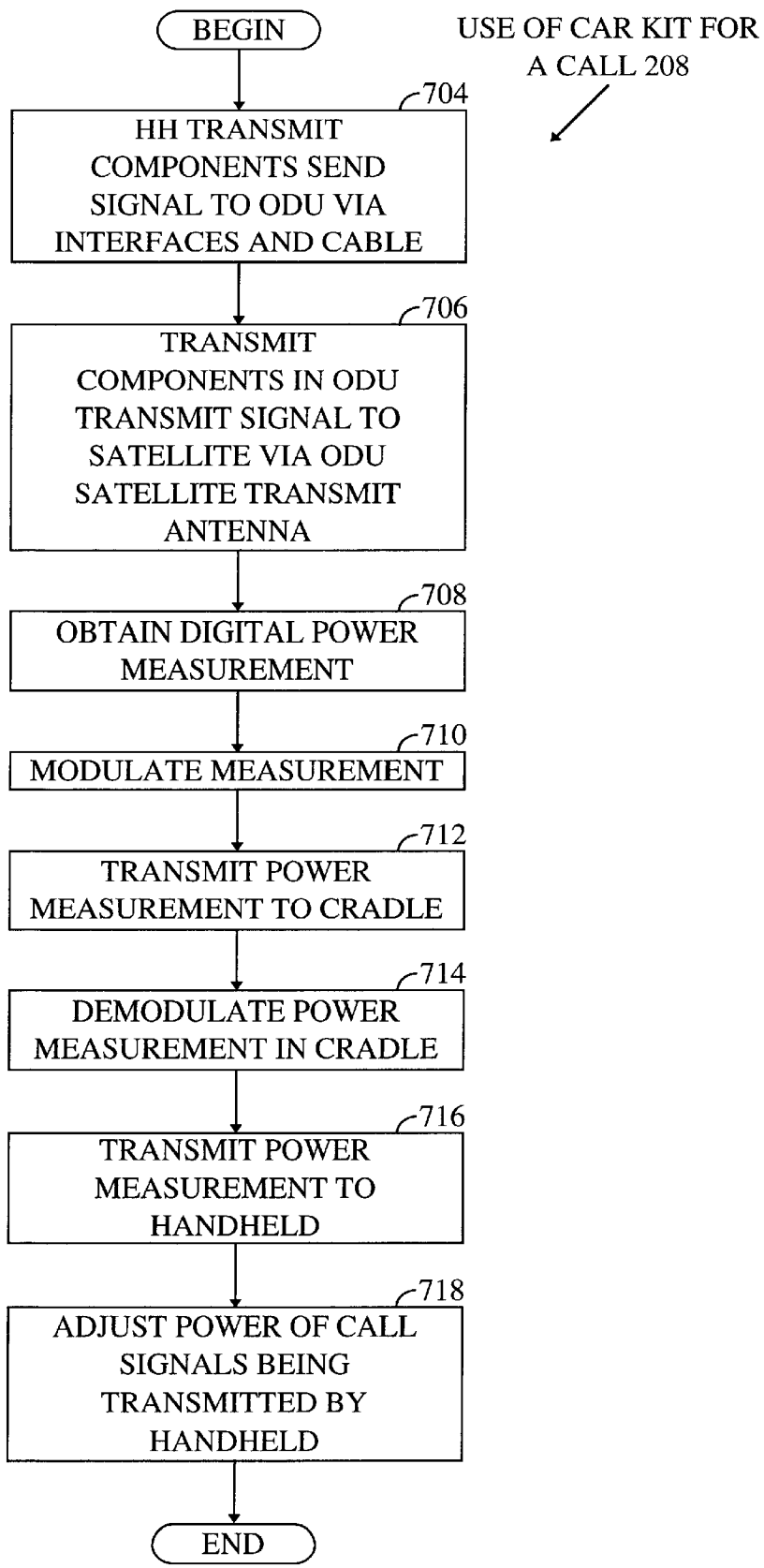
FIG. 7 is a flowchart illustrating the use of a car kit for placing a call according to a preferred embodiment of the present invention.

FIG. 7 is a flowchart illustrating the operation of step 208 of FIG. 2, namely the use of a car kit 104 to place or receive a call. Information passes to and from car kit 104 during progress of a call. First, a call is established, then the parties proceed to communicate information, and finally the call is terminated. Information signals containing the information needed for each of these phases of a call pass to and from car kit 104. The transmit power of the information signals is controlled by hand held device 110 using a power measurement signal obtained from ODU power control components 328 within ODU 112.

The flowchart in FIG. 7 begins with step 704. In step 704, HH transmit components 304 send the information signal to ODU 112 via cable 111. If the information signal is the first information signal of a particular call, the initial power of the information signal has been determined by preliminary processing occurring in step 206 of FIG. 2 performed by HH logic unit 308 using information stored in ODU logic unit 318 (including the design specification parameters in design specification parameter tables 422). The preliminary processing is described in more detail above with respect to FIG. 6.

Multiple information signals may be sent during the progress of a call which result in repeated processing of step 208. That is, a call or communication link, meaning information signals, including access requests for the gateway, may be sent over a period of time and result in repeated adjustments of signal power. If an information signal is not the first information signal of a particular call, the power of the information signal has been determined by previous processing of step 708. The information signal may include the following types of information: information to establish the call to a recipient, information to be sent from hand held device 110 to a recipient, such as a digitized version of someone's voice, data transmitted via personal computers, digitized versions of the content on pages transmitted via facsimile, and information to indicate that one of the parties has terminated the call. The information signal may also include information or signals needed to establish or terminate a call following HH transmit components 304 send the information signal to ODU 112. The signal is received by ODU transmit components 312 within ODU 112. The circuitry within transmit components 312 needed to transmit the signal from vehicle 106 to satellite 116 resides in ODU 112.

In step 706, transmit components 312 in ODU 112 transmit the signal to satellite 116 via ODU antenna 114. ODU antenna 114 is typically physically connected to the top of ODU 112 and contains the capability to transmit signals from vehicle 106 to satellite 116. When satellite 116 receives the signal from ODU antenna 114, satellite 116 sends the signal to antenna 118 where it is received and transferred to a recipient via gateway 120.

In step 708, ODU 112 provides an absolute power measurement to hand held device 110. As the signal is sent from transmit components 312 to ODU 114, power detector 314 obtains a measurement of the output power of the information signal. Power detector 314 is connected to the output of transmit components 312 to detect the output power. Because the power measurement is obtained immediately before the information signal is transmitted outside of car kit 104, it provides an accurate assessment of the impact of circuitry within car kit 104 on the power of the information signal. The power measurement is sent back to hand held device 110 for adjustments in the initial (or subsequent) power of the transmitted signal allowing for accurate power control. Obtaining a digital power estimation will be described in further detail with respect to FIG. 8.

In step 710, the digital power measurement is modulated by modulator 320. On off keying, half duplex modulation is used for modulation of the digital power measurement. Modulation of the digital power measurement is needed to transmit the power measurement from ODU 112 to cradle 108 via cable 111.

In step 712, the power measurement is transmitted to cradle 108. The modulated power measurement output from modulator 320 is sent to cradle 108 via cable 111.

In step 714, the power measurement is demodulated in cradle 108. Demodulator 310 in cradle 108 receives the modulated power measurement from ODU 112 via cable 111. Demodulator 310 demodulates the signal using demodulation techniques well-known in the art.

In step 716, cradle 108 sends the power measurement to hand held device 110. Demodulator 310 within cradle 108 sends the power measurement to logic unit 308 within hand held device 110 via the connection between hand held device 110 and cradle 108.

Finally, in step 718, hand held device 110 adjusts the power of information signals being transmitted. Hand held device 110 provides adjustments needed to the initial transmitted power of the signal to compensate for losses, constraints, or limitations in the circuitry of car kit 104. Adjustment by hand held device 110 of the power of transmitted information signals is described in further detail with respect to FIG. 9.

Figure 8:
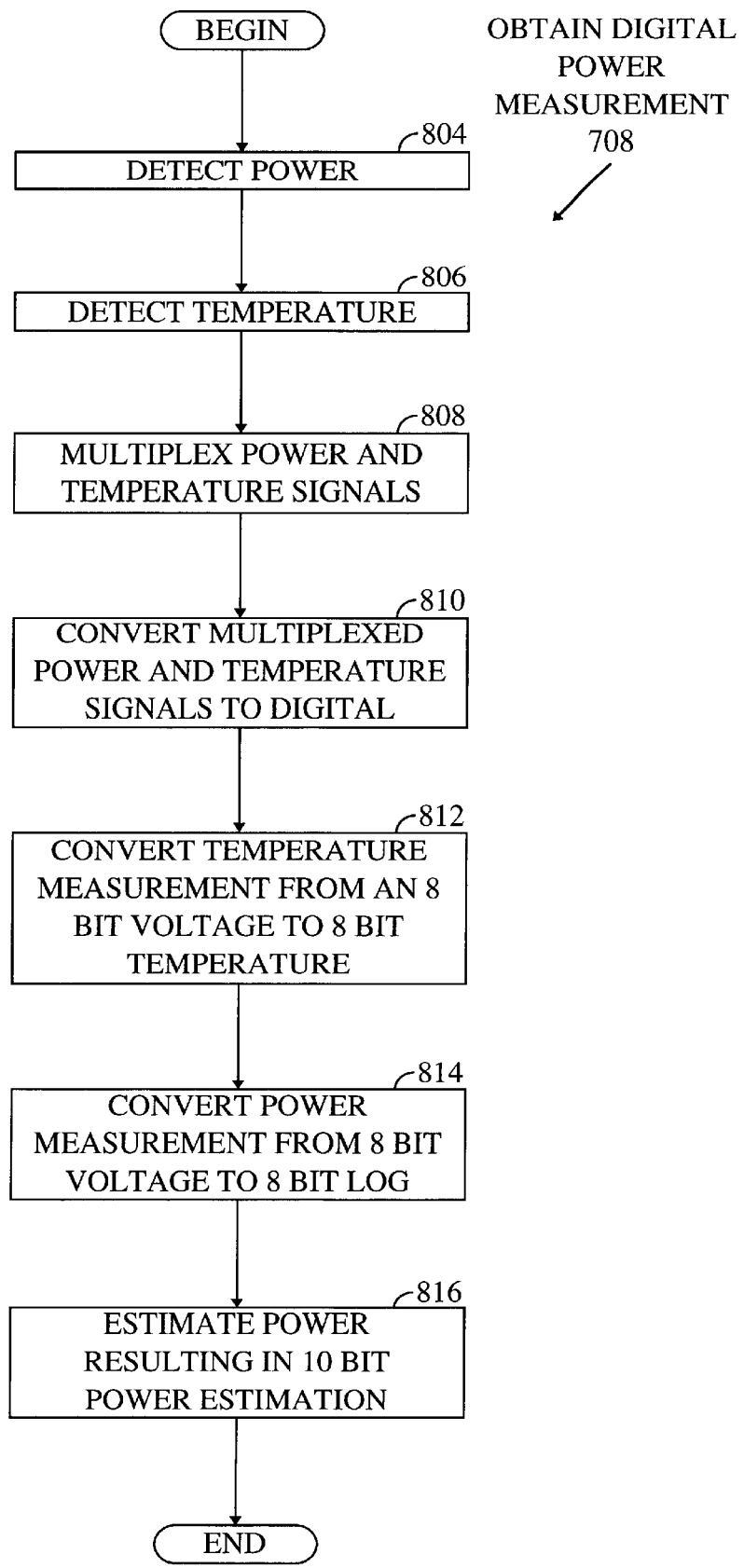
FIG. 8 is a flowchart illustrating the operation of obtaining a digital power measurement according to a preferred embodiment of the present invention.

FIG. 8 is a detailed flowchart of step 708, illustrating the operation of obtaining the digital power measurement. The flowchart in FIG. 8 begins with step 804.

In step 804, power is detected. The power is detected by power detector 314 at the output of ODU transmit components 312 immediately before the signal is transmitted by ODU antenna 114.

In step 806, the temperature is detected. Temperature detector 316 detects the temperature within ODU 112 using temperature detection techniques well-known in the art. Temperature is detected because the performance of many power detector models, including the Schottky power detector, varies based on temperature.

In step 808, the power and temperature signals are multiplexed. The power and temperature signals are multiplexed by multiplexer 402 in order to provide one multiplexed signal to A/D converter 404.

In step 810, the multiplexed power and temperature signals are converted to digital signals. A/D converter 404 converts the multiplexed signal comprising the power and temperature measurements to digital format.

In step 812, the temperature measurement is converted from an 8-bit voltage value to an 8-bit temperature value. The input of temperature look-up table 406 is an 8-bit voltage 411 received from A/D converter 404. In the present embodiment, processing of the temperature look-up table 406 results in an 8-bit temperature. However, the process is not limited to nor dependent upon using 8-bit values or data words. The various digital systems or processing techniques illustrated herein do not depend on using digital words or data values of the specific lengths given herein. These digital values or words are given by way of example only, and the technique can be implemented using digital values with other data resolutions, that is, longer or shorter words, within the teachings of the invention, as desired.

In step 814, the power measurement is converted from an 8-bit voltage to an 8-bit log. In addition to sending an 8-bit voltage, A/D converter 404 sends a 10-bit voltage to the logarithmic transformation table 410. Processing of logarithmic transformation table 410 results in an 8-bit log voltage.

Finally, in step 816, a resulting estimated power is determined that is a 10-bit power estimation. Both the 8-bit temperature from temperature look-up table 406 and the 8-bit log voltage from logarithmic transformation table 410 are received and processed by power estimator 408. Power estimator 408 uses the 8-bit temperature and 8-bit log and produces the 10-bit power estimation. The 10-bit power estimation is formatted according to the protocol shown m FIG. 10 and sent to modulator 320.

Figure 9:
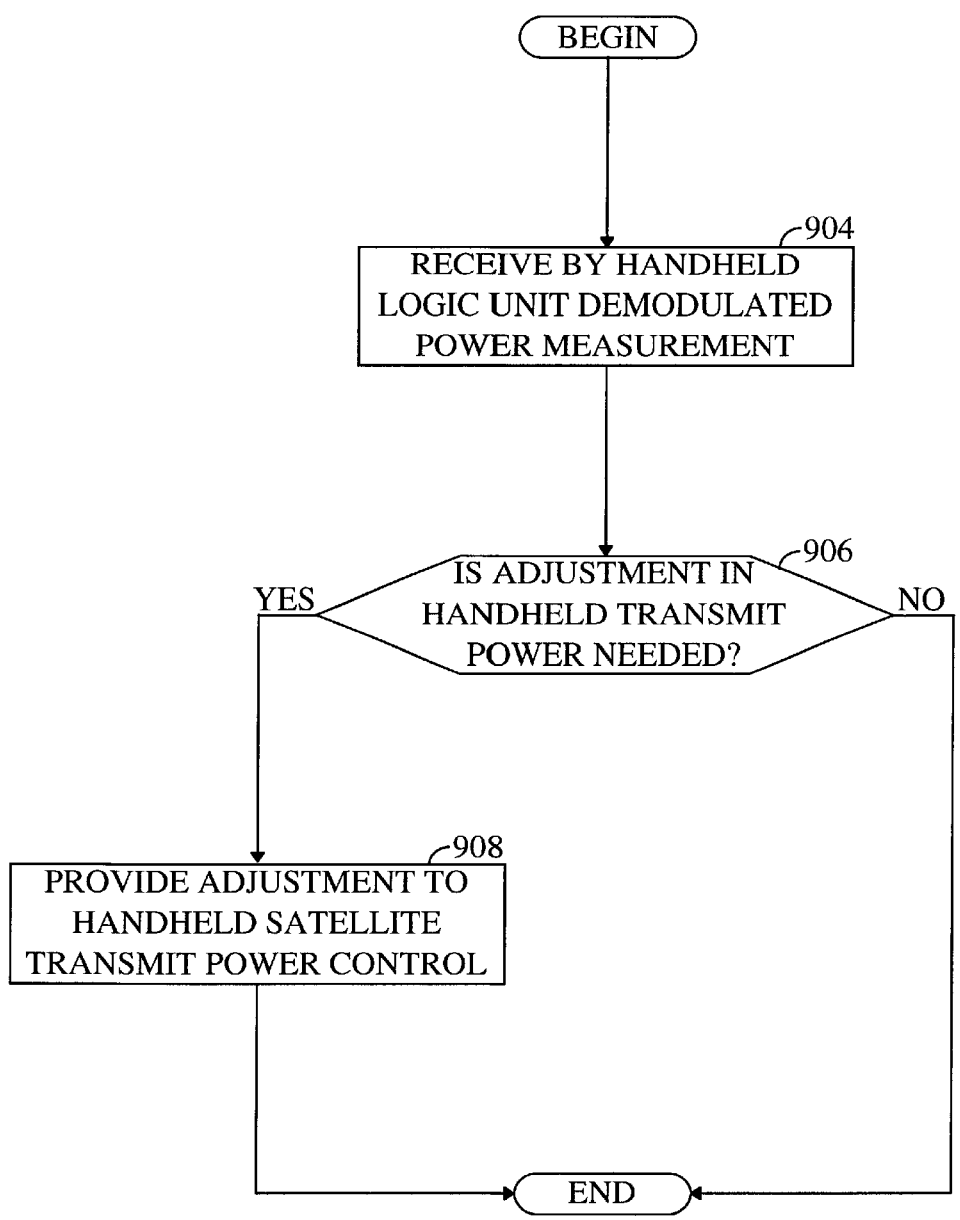
FIG. 9 is a flowchart illustrating adjustment of transmit power by a hand held device according to a preferred embodiment of the present invention.

FIG. 9 is a detailed flowchart of step 718, illustrating the operation of adjusting the transmit power by hand held device 110. The flowchart in FIG. 9 begins with step 904.

In step 904, logic unit 308 receives the demodulated power measurement.

In step 906, hand held device 110 determines whether or not an adjustment in transmit power is needed. An adjustment in power may be needed because hand held device 110 needs to vary the power in conjunction with maintaining a desired communication link quality or signal strength, and/or because the output power from ODU 112 is different from the power of the signal transmitted from hand held device 110. Often adjustments are needed both to change the desired power and compensate for error or differences in the transmission via ODU 112. The power of the signals transmitted from hand held device 110 varies based on the data rate of the information. Varying data rate occurs when variable rate vocoders, specialized equipment, or other known input devices are used for creating the information signal.

Logic unit 308 compares the current initial transmit power to the power measurement received from ODU 112. A calculation of difference of the power measurement received from ODU 112 subtracted from the current initial transmit power from HH transmit components 304 provides an error measurement. A calculation is then made using the error measurement and the desired next power to be transmitted from transmit components 304.

If an adjustment in transmit power is needed, the processing proceeds to step 908. If an adjustment in transmit power is not needed, the processing flow of FIG. 9 is completed.

In step 908, transmit components 304 adjust the power of the transmitted signal.

Figure 10:
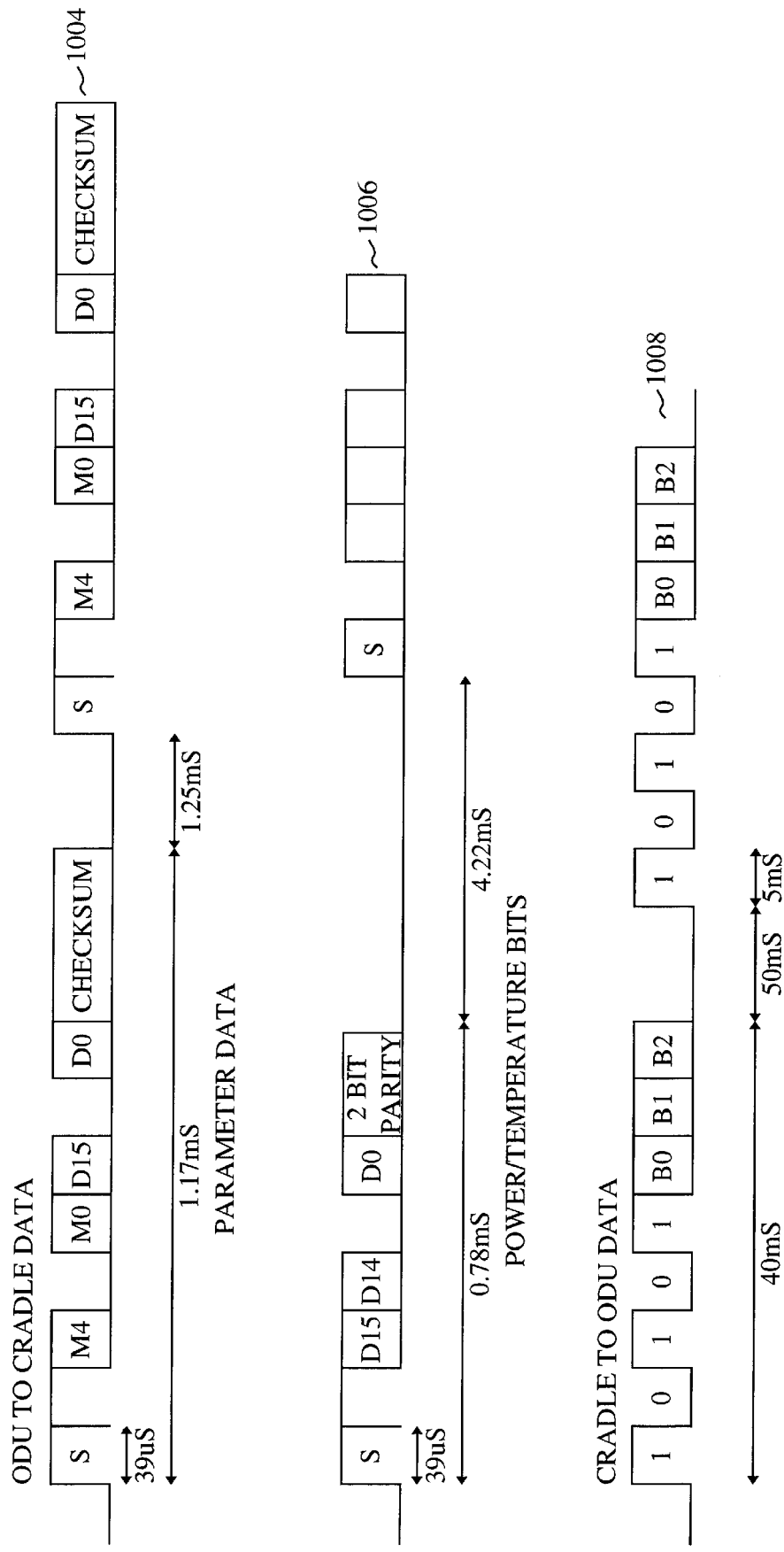
FIG. 10 is a diagram illustrating car kit communications protocol.

FIG. 10 illustrates car kit communications protocol 1002. FIG. 10 provides the timing of design specification parameter, power, and temperature data sent from ODU 112 to cradle 108 according to one embodiment of the present invention. The packet length for sending parameter data 1004 is longer and supports error checking. The packet length for sending power data 1006 is shorter and faster but has parity for primitive error detection.

In addition, the timing for sending data 1008 from cradle 108 to ODU 112 is illustrated. Messages are not required to be sent from cradle 108 to ODU 112 for operation of the present invention. However, in one embodiment of the present invention, messages are sent in order to assist in ODU 112 communication. In order to send messages from cradle 108 to ODU 112, cradle 108 has a modulator (not shown) and ODU 112 has a demodulator (not shown). On off keying type modulation is typically used for transmission from cradle 108 to ODU 112.

Data send and data OK messages sent from cradle 108 to ODU 112 inform ODU 112 that it should send design specification parameter data and acknowledge that design specification parameter data has been sent. If a checksum error occurs when design specification parameter data is being transmitted, cradle 108 retransmits the previous design specification parameter. A transmit components on/off message indicates that transmit components 312 are to turn on or off, respectively. Alternatively, the message may be a power amplifier on/off message indicating that a power amplifier within transmit components 312 should be turned on or off. A bias hi/lo message indicates to ODU 112 that a power amplifier should be switched to high/low bias depending on emission (signal strength) requirements, or desired constraints. Each message is repeated at least twice in succession to be recognized and provide rudimentary error checking. Other numbers of repetitive transfers could be used, as well as pre-selected spacing between transfers.

Figure 11:
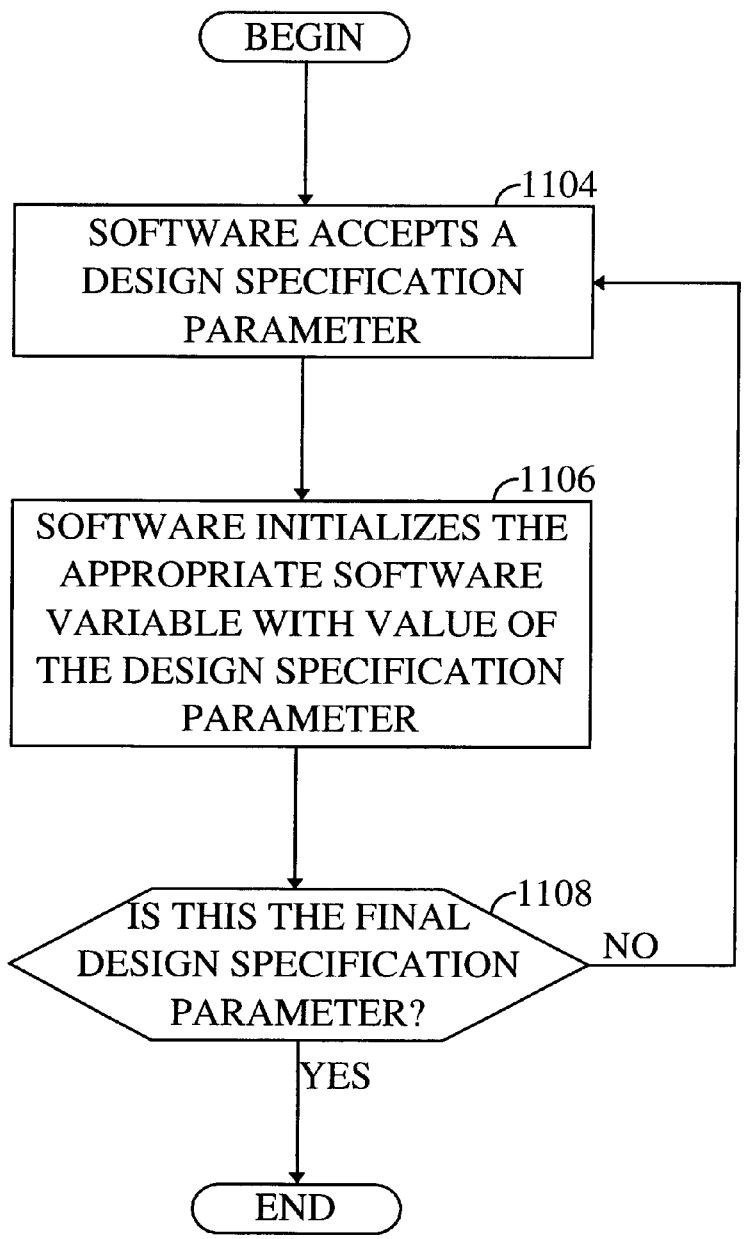
FIG. 11 is a flowchart illustrating the operation of a processor processing software of the hand held logic unit according to a preferred embodiment of the present invention.

The process of how processor 501 in hand held device 110 utilizes the design specification parameters to adapt to the particular ODU 112 is now described in reference to FIG. 11. The flowchart in FIG. 11 begins with step 1104. In step 1104, processor 501 accepts the first design specification parameter from ODU 112 via cradle 108 as described above in reference to FIG. 6. An example communications protocol for the design specification parameters was described above in reference to FIG. 10. In step 1106, processor 501 assigns, generally using software, the value of the design specification parameter that was passed to a corresponding software variable.

In step 1108, it is determined whether or not this is the final design specification parameter. If this is the final design specification parameter, the processing flow of FIG. 11 ends. If this is not the final design specification parameter, processing proceeds to step 1104 to receive the next design specification parameter. This continues until processor 501 has received all of the design specification parameters and the variables have all been initialized to a value.

While various embodiments of the present invention have been described above, it should be understood that they have been presented by way of example only, and not limitation. Thus, the breadth and scope of the present invention should not be limited by the above-described exemplary embodiments, but should be defined only in accordance with the following claims and their equivalents.

What we claim as our invention is:

1. Apparatus for obtaining an output power measurement of an information signal, wherein the output power measurement is sent from an external antenna unit to a hand held device coupled thereto, comprising:
   a power detector for detecting output power from the antenna unit, wherein said power detector has a power detector output;
   a logic unit for converting said detected output power into a digital power measurement, wherein said logic unit is coupled to said power detector output and wherein said logic unit has a means for transmitting a design specification parameter from the antenna unit to the hand held device; and
   a modulator for modulating said digital power measurement for transmission to the hand held device, wherein said modulator is coupled to said logic unit.

2. The apparatus of claim 1, wherein said design specification parameter comprises one or more parameters selected from the group consisting of maximum gain deviation, power detector minimum accurate power, power amplifier supply voltage, power amplifier hi/low bias versus frequency, maximum effective isotropic radiated power versus frequency, maximum effective isotropic radiated power backoff, gain compression, propagation delay between hand held device and unit transmit antenna, propagation delay between hand held device and unit receive antenna, transmit gain, and receive gain.

3. Apparatus for controlling transmit power of an information signal in a wireless device using an output power measurement received from an external antenna unit, comprising:
   a demodulator having a demodulator input and a demodulator output for demodulating a received measurement signal comprising said output power measurement;
   a logic unit in said wireless device that determines an appropriate transmit power of said information signal, said logic unit being coupled to said demodulator output and receives a design specification parameter from said antenna unit; and
   a wireless device transmit component for initiating said information signal from the wireless device, said transmit component being coupled to said logic unit.

4. The apparatus of claim 2, wherein said design specification parameter comprises one or more parameters selected from the group consisting of maximum gain deviation, power detector minimum accurate power, power amplifier supply voltage, power amplifier hi/low bias versus frequency, maximum effective isotropic radiated power versus frequency, maximum effective isotropic radiated power backoff, gain compression, propagation delay between hand held device and unit transmit antenna, propagation delay between hand held device and unit receive antenna, transmit gain, and receive gain.

5. A communications network interface device for transmission of an information signal, comprising:
   an antenna unit, including:
      at least one antenna unit transmit component, wherein said antenna unit transmit component outputs the information signal,
      an output power measurement feedback circuit, comprising:

a power detector for detecting output power from said antenna unit, wherein said power detector has a power detector input and a power detector output, said power detector input being connected to said antenna unit transmit component that outputs the information signal, a first logic unit for converting said output power into a digital power measurement, wherein said first logic unit is coupled to said power detector output and wherein said first logic unit includes means for storing a design specification parameter of said antenna unit, and a modulator for modulating said digital power measurement for transmission to said hand held device, wherein said modulator is coupled to said first logic unit, and at least one antenna unit receive component;

a cradle coupled to said antenna unit, said cradle including a demodulator for demodulating formatted messages and having a demodulator input and a demodulator output; and a hand held device, including:
- a second logic unit having software, wherein said second logic unit determines an appropriate transmit power of said information signals, wherein said second logic unit is coupled to said demodulator output and wherein said software receives said design specification parameter from the antenna unit, and
- at least one hand held transmit component for initiating said information signal from said hand held device, wherein said hand held transmit component is coupled to said second logic unit.

6. The communications network interface device of claim 5, wherein said design specification parameter comprise one or more parameters selected from the group consisting of maximum gain deviation, power detector minimum accurate power, power amplifier supply voltage, power amplifier hi/low bias versus frequency, maximum effective isotropic radiated power versus frequency, maximum effective isotropic radiated power backoff, gain compression, propagation delay between hand held device and unit transmit antenna, propagation delay between hand held device and unit receive antenna, transmit gain, and receive gain.

7. A method for obtaining an output power measurement of an information signal, wherein the output power measurement is sent from an antenna unit to a hand held device, comprising the steps of:

(a) obtaining from the antenna unit a digital output power measurement and a design specification parameter;

(b) modulating said digital output power measurement; and (c) transmitting said modulated digital output power measurement and said design specification parameter to the hand held device.

8. The method of claim 7, wherein step (a) comprises:

detecting output power of the antenna unit;

detecting temperature of the antenna unit;

multiplexing said detected output power and said detected temperature;

converting said multiplexed signal to digital format, wherein said converted signal comprises a digital temperature measurement and a digital power measurement;

converting said digital temperature measurement from a first voltage format to a temperature format;

converting said digital power measurement from a second voltage format to a logarithmic format; and estimating power resulting in a power estimation to create a digital output power measurement.

9. The method of claim 7, further comprising the steps of:

(d) demodulating said modulated digital output power measurement; and (e) adjusting power of the information signal by the hand held device based on said digital output power measurement and said design specification parameter.

10. The method of claim 9, wherein step (d) comprises the steps of:

receiving at the hand held device said modulated digital output power measurement; and determining whether an adjustment is needed to the information signal power.

11. The method of claim 10, wherein step (d) further comprises the step of adjusting the information signal power.

12. The method of claim 7, wherein said design specification parameter comprise one or more parameters selected from the group consisting of maximum gain deviation, power detector minimum accurate power, power amplifier supply voltage, power amplifier hi/low bias versus frequency, maximum effective isotropic radiated power versus frequency, maximum effective isotropic radiated power backoff, gain compression, propagation delay between hand held device and unit transmit antenna, propagation delay between hand held device and unit receive antenna, transmit gain, and receive gain.

13. A method for providing a design specification parameter from an antenna unit to a hand held device, comprising:

transmitting the design specification parameter from the antenna unit to the hand held device;

determining whether the design specification parameter is a final parameter; and if the design specification parameter is a final parameter, turning on one or more transmit components within the antenna unit.

14. The method of claim 13, further comprising the step of initializing a variable by setting said variable equal to the design specification parameter.

15. The method of claim 14, wherein the design specification parameter comprises one or more parameters selected from the group consisting of maximum gain deviation, power detector minimum accurate power, power amplifier supply voltage, power amplifier hi/low bias versus frequency, maximum effective isotropic radiated power versus frequency, maximum effective isotropic radiated power backoff, gain compression, propagation delay between hand held device and unit transmit antenna, propagation delay between hand held device and unit receive antenna, transmit gain, and receive gain.

* * * * *